J. A. BAINES.
Metallic Bench-Planes.

No. 148,649. Patented March 17, 1874.

WITNESSES:
Jas. E. Hutchinson
H. C. Hagard

INVENTOR.
John A. Baines, by
Prindle and Dean, his Att'ys

J. A. BAINES.
Metallic Bench-Planes.

No. 148,649.    Patented March 17, 1874.

WITNESSES:
Jas. E. Hutchinson
H. C. Hazard.

INVENTOR.
John A. Baines, by
Prindle and Deane, his Attys.

J. A. BAINES.
Metallic Bench-Planes.

No. 148,649.  Patented March 17, 1874.

WITNESSES:
Jas. E. Hutchinson
H. C. Hazard

INVENTOR.
John A. Baines, by
Prindle and Deane, his Attys

J. A. BAINES.
Metallic Bench-Planes.

No. 148,649. Patented March 17, 1874.

WITNESSES:
Jas. E. Hutchinson
Hel C. Hagard

INVENTOR.
John A. Baines, by
Prindle and Dean, his Attys

J. A. BAINES.
Metallic Bench-Planes.

No. 148,649. Patented March 17, 1874.

Witnesses:
Jas H Hutchinson
H C Hazard

Inventor.
John A Baines, by
Prindle and Deam, his Attys

J. A. BAINES.
Metallic Bench-Planes.

No. 148,649. Patented March 17, 1874.

WITNESSES:
Jas. E. Hutchinson
Hele Hagard

INVENTOR.
John A. Baines, by
Prindle and Deam, his Attys

J. A. BAINES.
Metallic Bench-Planes.

No. 148,649. Patented March 17, 1874.

WITNESSES:
Jas. E. Hutchinson
H. C. Hazard.

INVENTOR.
John A. Baines, by
Prindle and Deane, his Attys

J. A. BAINES.
Metallic Bench-Planes.

No. 148,649. Patented March 17, 1874.

WITNESSES:
Jas E Hutchinson
H C Hazard

INVENTOR
John A Baines, by
Prindle and Beam, his Attys

AM. PHOTO-LITHOGRAPHIC Co. N.Y. (OSBORNE'S PROCESS.)

J. A. BAINES.
Metallic Bench-Planes.

No. 148,649. Patented March 17, 1874.

WITNESSES:
Jas. E. Hutchinson
H. C. Hazard.

INVENTOR.
John A. Baines, by
Prindle and Pearn, his
attorneys

UNITED STATES PATENT OFFICE.

JOHN A. BAINES, OF NEW YORK, N. Y.

IMPROVEMENT IN METALLIC BENCH-PLANES.

Specification forming part of Letters Patent No. 148,649, dated March 17, 1874; application filed February 9, 1874.

*To all whom it may concern:*

Be it known that I, JOHN A. BAINES, of New York city, in the county of New York and in the State of New York, have invented certain new and useful Improvements in Metallic Bench-Planes; and do hereby declare that the following is a full, clear, and exact description thereof, reference being had to the accompanying drawings making a part of this specification, in which—

Letters of like name and kind refer to like parts in each of the figures.

The design of my invention is to lessen the cost and reduce the bulk of planes for producing irregular work; and to this end it consists in the construction and combination of the frame and various attachments employed for forming the different styles of plane, substantially as and for the purpose hereinafter specified.

Figure 1:
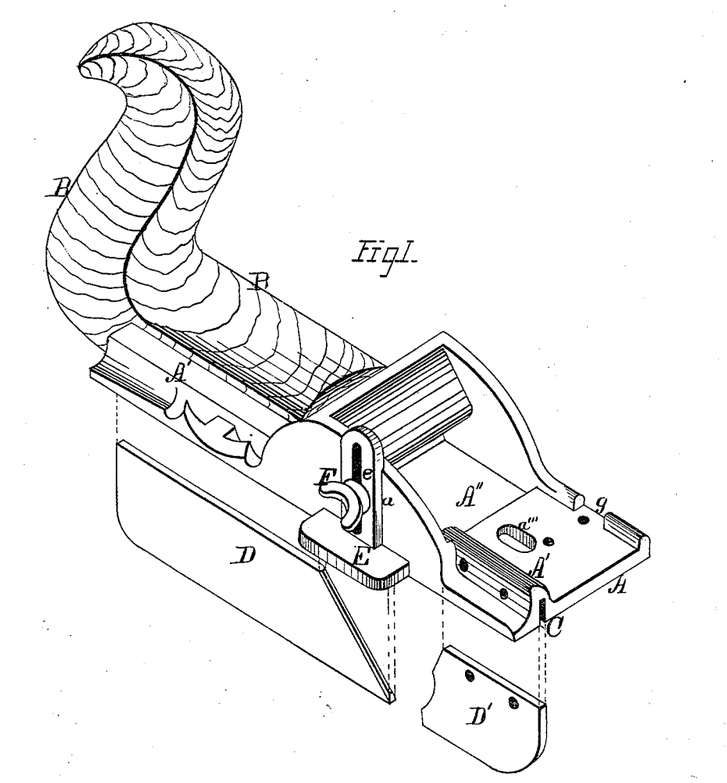
Figure 1 is a perspective view of the main frame, side gage, and sole or base plates of my plane.
Figure 2:
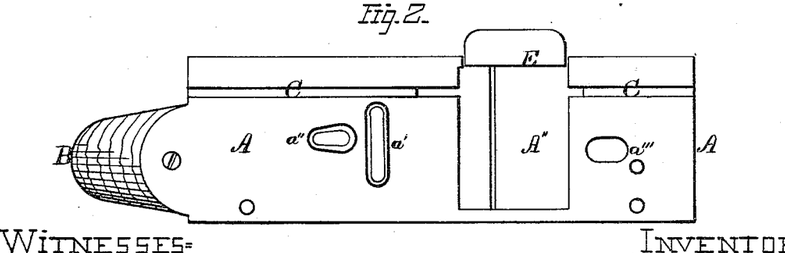
Fig. 2 is a plan view of the lower side of said frame.

In the annexed drawings, A represents the main frame of my tool, which has a plain lower surface, and at its upper side has such conformation as to enable it to receive the usual form of cutting-irons with the fastening-wedge, to permit the upward passage of shavings, and to provide for the attachment of a handle, B. Within the lower side, and near one edge of the frame A, is formed a narrow groove, C, which extends vertically upward within an enlargement or rib, A', provided for the purpose, has a line parallel to the side of said frame, and receives two plates, D and D', (shown in Fig. 1,) that form the base or sole. Two or more removable pins, $d$ and $d$, pass horizontally and laterally inward through the side of said frame A, and through each of said plates D and D', and locks the latter securely in position, when desired. Upon the inner side of the frame A is formed a vertical groove, $a$, that receives the standard $e$ of an adjustable gage, E, which gage is secured to or upon said frame, and held in vertical position by means of a screw, F, that passes into a threaded opening in the latter through a vertical slot in said standard.

Within the upper side of the frame A, near its ends, are formed two transverse grooves, $g$ and $g$, that receive the ends of two corresponding bars, G and G', which bars, when in position, are fastened by means of a screw, H, as shown in the front bar, or a pin, H', as seen in the rear bar, said screw or pin being passed vertically downward through said bars into said frame. From the frame A the bars G and G' extend laterally outward, and have their lower sides upon a line with the lower face of the former, in which position they form an extension of said face, and permit of the attachment of an angle-plate, I, (shown in Fig. 5,) which plate, being adjustable laterally toward or from the cutting-irons, forms a gage for several forms of plane. Within the lower side of the frame A, at or near its longitudinal center, is formed a transverse slot, $a'$; in rear of the same is provided a longitudinal slot, $a''$; while in front of the throat A'' is a second longitudinal slot, $a'''$, the object of which is to enable the attachment of various parts required for forming several of the planes, said parts being described in connection with each plane of which it forms a part.

Figure 3:
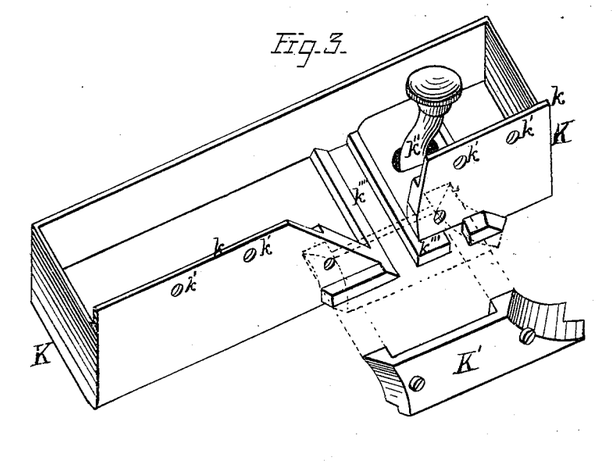
Fig. 3 is a perspective view of the detachable block or frame used for forming the smoothing and filletster planes.
Figure 4:
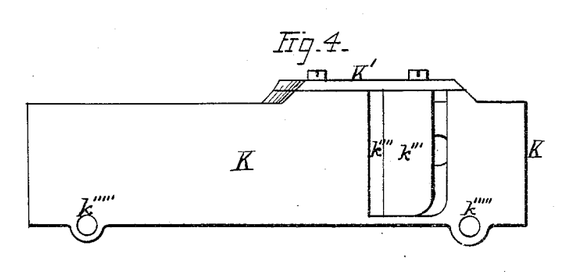
Fig. 4 is a plan view of the lower side of the same.

For use as a smoothing-plane, a hollow block, K, having the general form shown in Fig. 3, is placed upon the lower side of the main frame, and secured in position by means of its inner side $k$, which extends upward into the groove C, and is provided with suitable openings $k'$ for the passage of the pins $d$ and $d$.

The bolt $k''$ of an adjustable throat-piece, $k'''$, projects upward through slots in said block and main frame and furnishes an additional means for securing said parts together.

The block K is provided with a throat, $k''''$, which coincides with the throat of the main frame, and enables a cutting-iron, of usual form to be inserted and secured in place by means of the ordinary wedge.

To construct a filletster, the inner end of the throat $k''''$ of the block K is uncovered by the removal of a covering plate or cap, K', and the gage I attached to the lower face and outer side of said block, suitable threaded openings $k'''''$ being provided within said block, for the reception of the binding-screws I' of said gage.

The gage E is also placed in position and adjusted to depth, and, in connection with said gage I, enables the dimensions of the fillet or rabbet to be determined with certainty.

Figure 5:
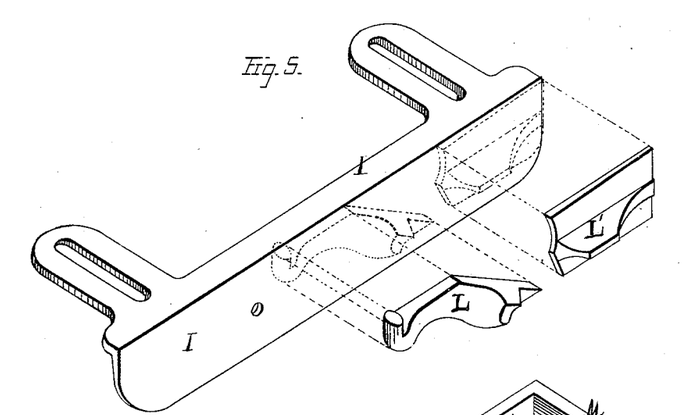
Fig. 5 is a perspective view of the bottom gage.

For use as a tonguing (matching) plane, the plates D and D' are placed in position, the gage I attached to the lower face of the frame A, and upon the face of said gage is attached two blocks, L and L', which have the form shown in Fig. 5, and perform the double office of a support for the heel of the inner half of the cutting-iron, and a gage for the depth of its cut. The gage E is also employed, its office being to insure the correct depth of cut for the outer half of said cutting-iron.

Figures 15, 16:
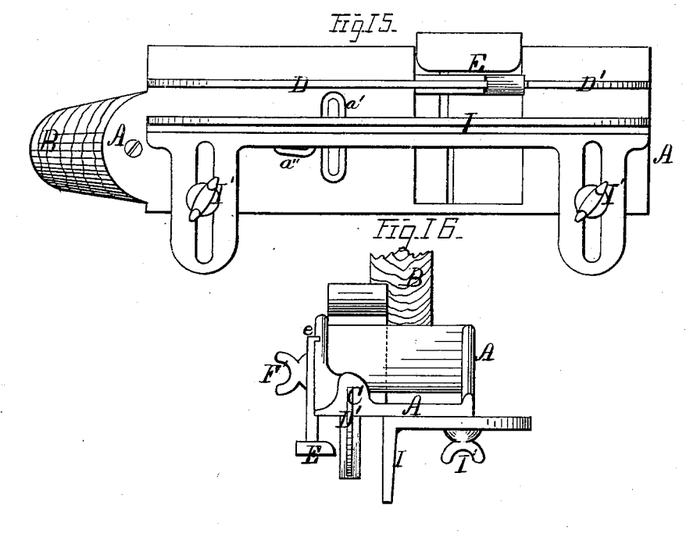
Fig. 15 is a plan view of the lower side of the grooving-plane.
Figs. 16 and 17 are, respectively, a front and a side elevation of said plane.
Figure 17:
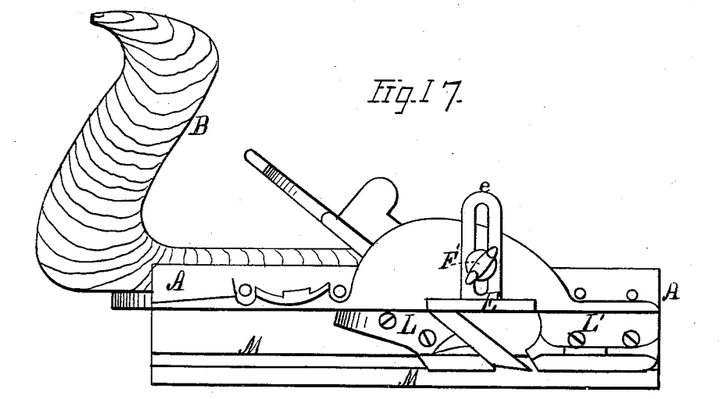
Figure 18:
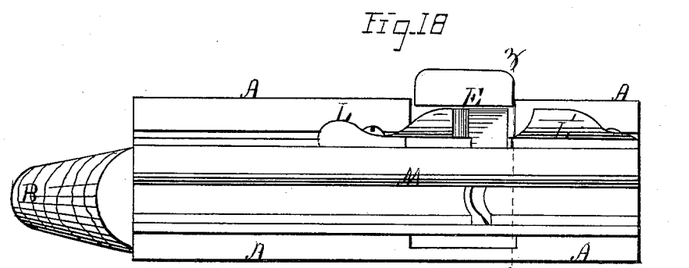
Fig. 18 is a plan view of the lower side of the sash-plane.
Figure 19:
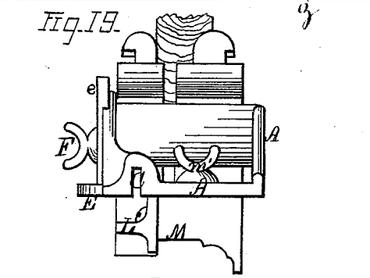
Fig. 19 is a front elevation of the same.

For a grooving-plane, the blocks L and L' are removed, the gage I is moved inward to the position required by the thickness of the board, and a single cutting-tool inserted in place of the double one before used. The gage E is now reversed, so as to cause its bearing-face to extend inward nearly to the cutting-iron, the arrangement of parts being as shown in Figs. 15 and 16.

Figure 6:
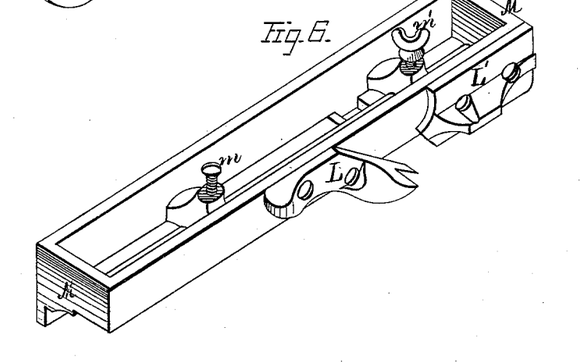
Fig. 6 is a like view of the detachable block employed for forming the sash-plane.
Figure 7:
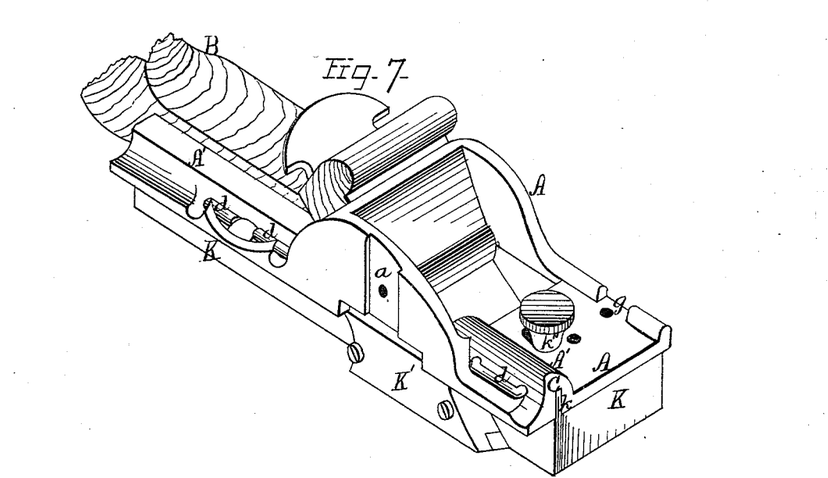
Fig. 7 is a perspective view of the smoothing-plane complete.
Figure 8:
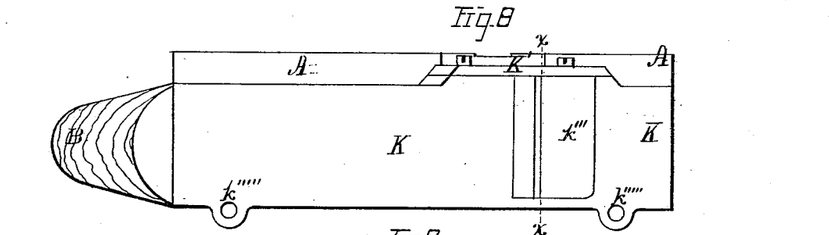
Fig. 8 is a plan view of the lower side of the same.
Figure 9:
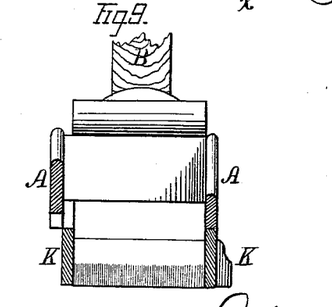
Fig. 9 is a vertical section upon line $x\ x$ of Fig. 8.
Figure 10:
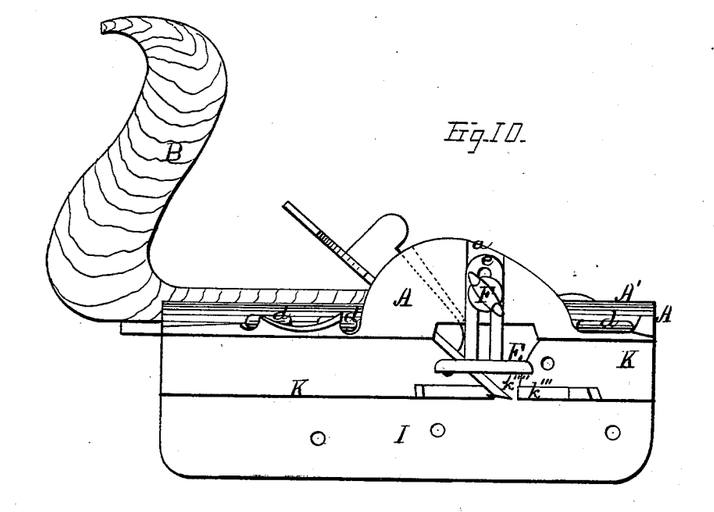
Fig. 10 is a side elevation of the filletster-plane.
Figure 11:
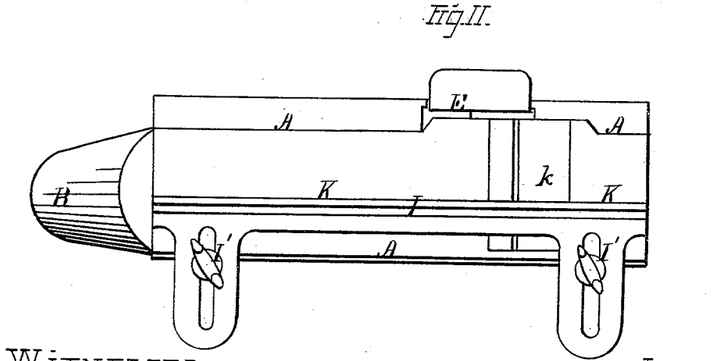
Fig. 11 is a plan view of the lower side of the same.
Figure 12:
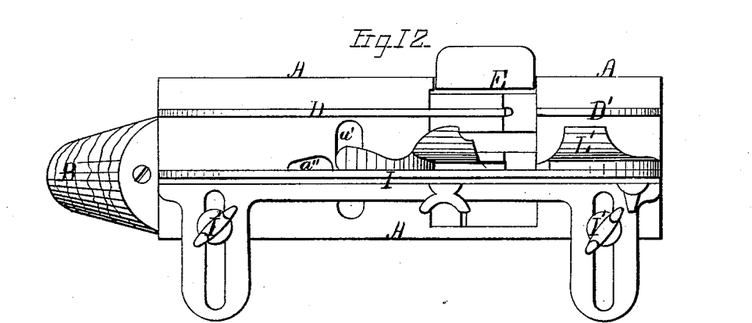
Fig. 12 is a plan view of the lower side of the tonguing-plane.
Figure 13:
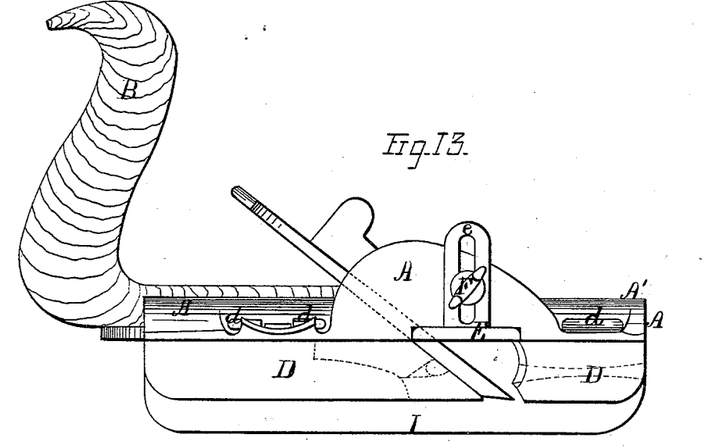
Figs. 13 and 14 are, respectively, side and front elevations of the same.
Figure 14:
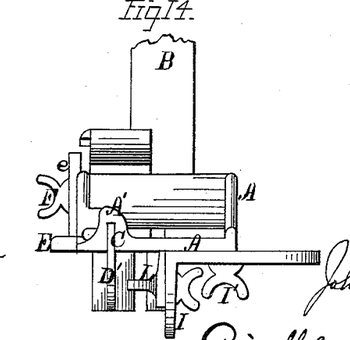
Figure 20:
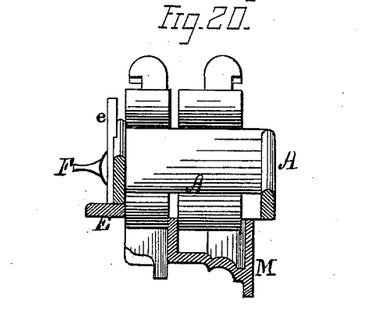
Fig. 20 is a section of said plane on line $z\ z$ of Fig. 18, the cutting-tools being arranged for forming the meeting rail.
Figure 21:
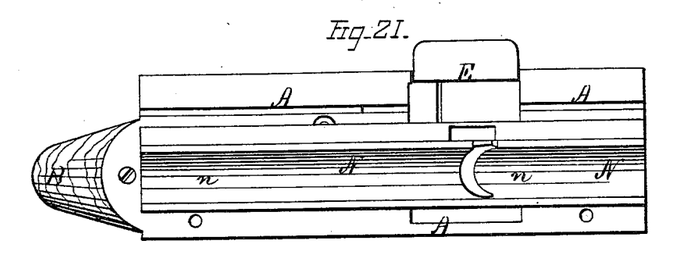
Fig. 21 is a plan view of the lower side of a bead or round plane.
Figure 22:
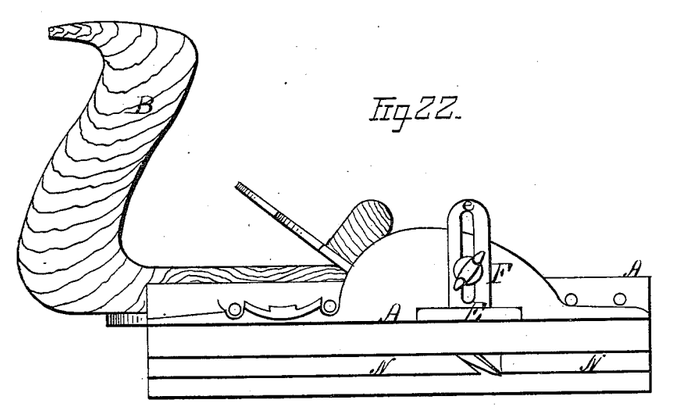
Figs. 22 and 23 are, respectively, a side and a front elevation of the same.

For use as a sash-plane, the plates D and D' and the gages E and I are removed, and a block, M, having the form shown in Figs. 6 and 20, secured upon the lower side of the frame A by means of a screw, $m$, which extends upward through the longitudinal slot $a''$ in said frame, and a second screw, $m'$, that passes downward through the transverse slot $a'''$ near the front end of said frame, and has its threaded end contained within a corresponding opening provided in said block. The blocks L and L' are now attached to the inner face of the block M, where they serve as supports and gages for the cutting-iron that forms within the sash-rail the rabbet for containing glass, while the cutter for forming the molding upon said sash-rail is placed within a suitable throat formed in and through the molded face of said block M.

For use in forming the meeting rail, the gage-blocks L and L' are removed, and the cutter shown in Fig. 20 inserted in place of that before employed for forming the glass rabbet.

Figure 23:
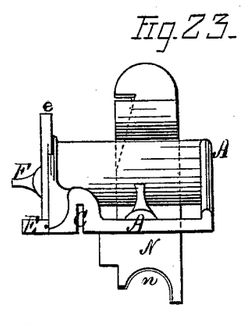

For use as a beading or rounding plane, the block M is removed and a block, N, having the transverse shape shown in Fig. 23, is secured in its place upon the frame A, the size and shape of the groove $n$ within the lower face of said blocks N and the corresponding features of the cutting-iron being varied to suit the especial purpose for which the tool is required.

Figure 24:
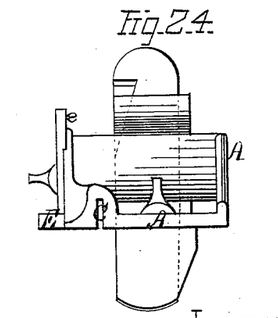
Fig. 24 is a front elevation of a hollow plane.
Figure 25:
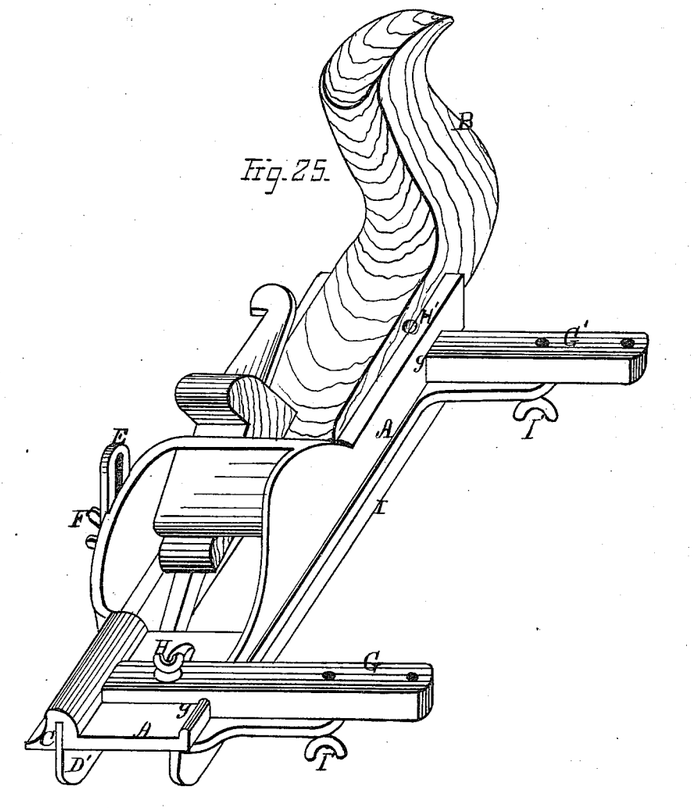
Fig. 25 is a perspective view of a plow-plane.
Figure 26:
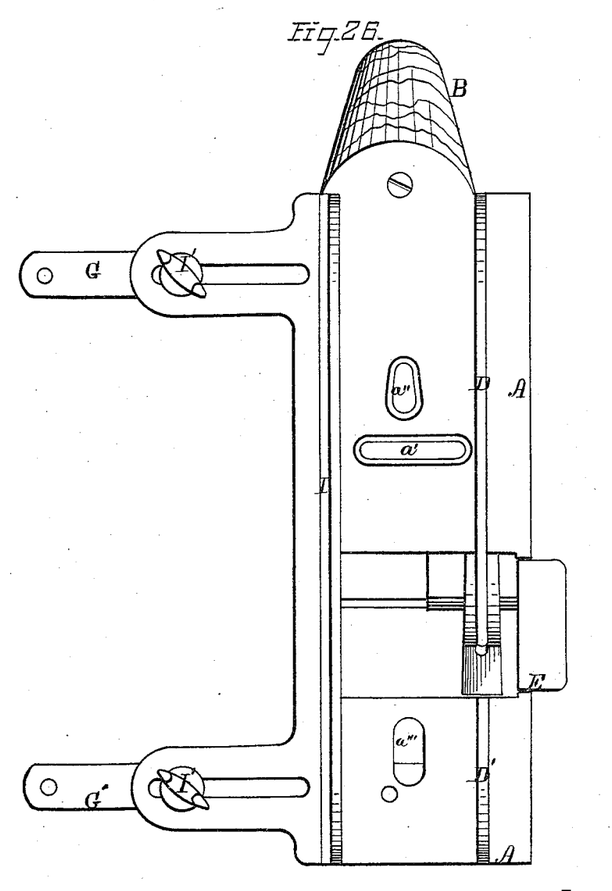
Fig. 26 is a plan view of the lower side of the same.
Figure 27:
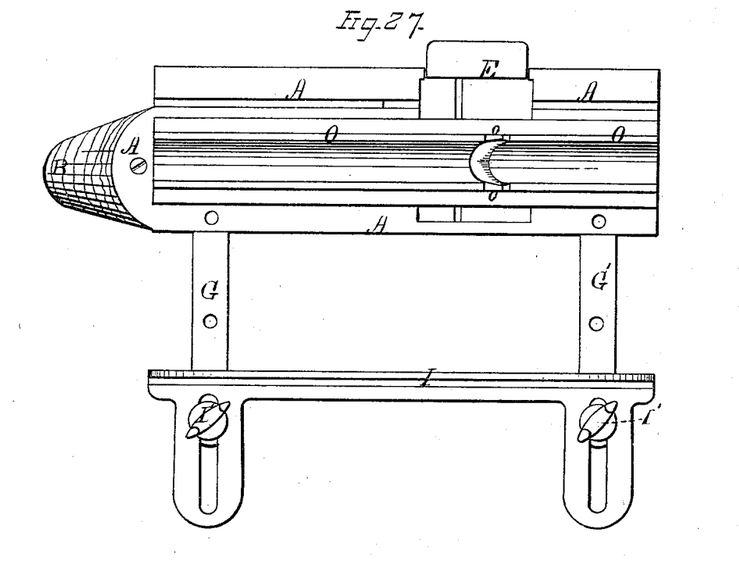
Fig. 27 is a like view of a plane for forming center-beads.

To form a hollow plane, the shape of the lower face of the block N and of the edge of the cutting-iron are reversed, as shown in Fig. 24.

For use as a plow, the plates D and D' are placed within the groove C, and the adjustable gage I secured upon the lower face of the frame A, or upon the extension-bars G and G', after which the usual form of cutting-iron is inserted within the space between said plates, its heel resting upon the forward end of the rear plate D.

Figure 28:
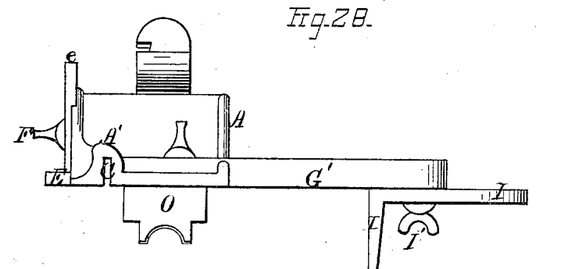
Fig. 28 is a front elevation of the same.

To form a center-bead plane, the extension-bars G and G' and gage I are employed as before, the plates D and D' are removed, and a hollow block, O, having the transverse form shown in Fig. 28, secured upon the lower face of the frame A. A cutting-iron having its lower or cutting end formed upon a line which corresponds to the grooved face of said block is placed in position within the throat $o$ of the same, after which the plane is used in the ordinary manner.

Figure 29:
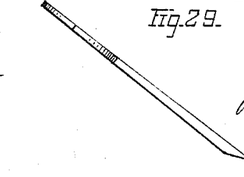
Fig. 29 is a side view of the cutting-irons employed, showing the shape of the cutting-edge of the same.

As seen in Fig. 29, the lower end and forward side of such plane-irons as usually require caps are beveled off at an angle of about forty-five degrees with said side, so as to render more obtuse the angle of the cutting-edge, and enable any kind of wood to be cut smoothly and with ease without the use of a cap, by which means a saving is effected in the cost of said cutting-irons, and in the time and labor required in manipulating the planes.

The device thus constructed combines, in a simple and compact form, a number of tools which are usually separate, and enables them to be furnished at a comparatively small cost.

Having thus fully set forth the nature and merits of my invention, what I claim as new is—

The hereinbefore-described plane, constructed in the manner and for the purpose substantially as specified.

In testimony that I claim the foregoing, I have hereunto set my hand this 6th day of February, 1874.

JOHN A. BAINES.

Witnesses:
JOHN R. YOUNG,
JAS. E. HUTCHINSON.